United States Patent Office 3,426,500
Patented Feb. 11, 1969

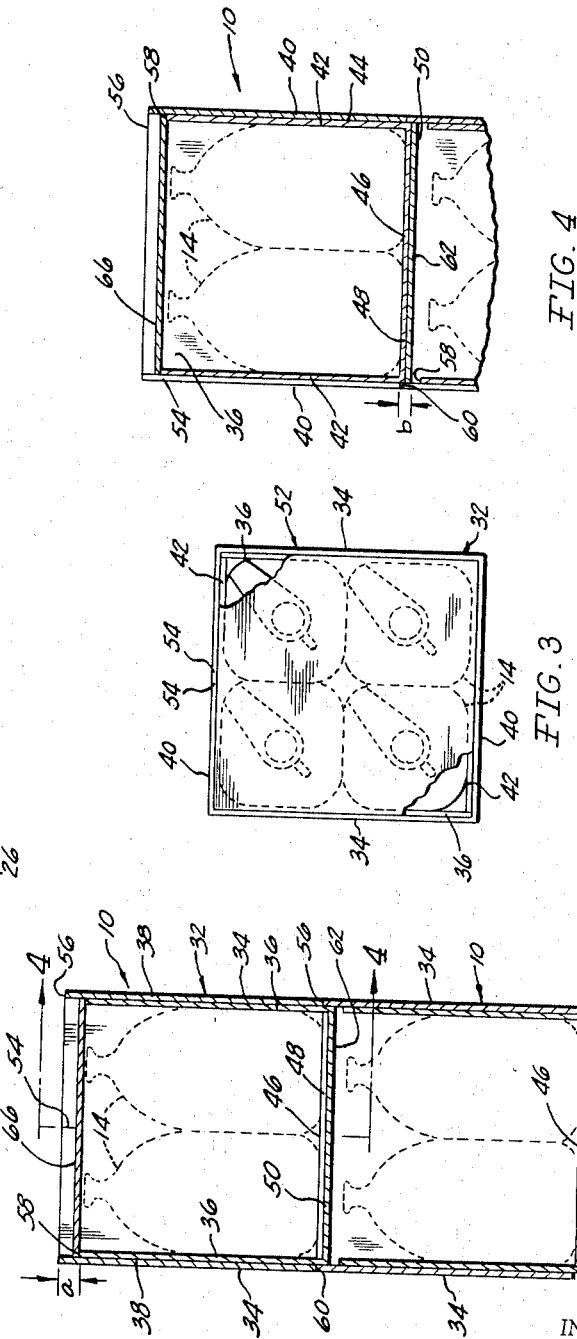

3,426,500
SYSTEM UTILIZING SINGLE SERVICE CONTAINER FOR MOVING BOTTLES FROM BOTTLE MAKING MACHINE TO DESTINATION POINT FOR FILLED BOTTLES
Samuel J. Rupert, Ann Arbor, Mich., assignor to Hoover Ball and Bearing Company, Saline, Mich., a corporation of Michigan
Filed June 9, 1965, Ser. No. 462,647
U.S. Cl. 53—37                                                     1 Claim
Int. Cl. B65b *3/04, 21/06, 35/30*

ABSTRACT OF THE DISCLOSURE

A system of blow molding plastic bottles, immediately placing the blown bottles in an upright position in a single service container, stacking the containers with the bottles therein at a storage station, transferring containers with empty bottles from the storage station to a filling machine and filling such bottles while in the container, transferring the containers with filled bottles to a capping station where the bottles are capped while in the containers, and restacking said filled containers with capped bottles for transportation to their final destination point.

---

This invention relates to a system providing for sanitary storage and transportation of plastic bottles commencing at the machine in which the bottles are made and terminating at the final destination point for the filled bottles, and to a single service container in which the bottles are supported and housed in the system.

The system and container of this invention are particularly adapted for use in transporting milk in plastic bottles to a supermarket, distribution center, or other point of final destination and will therefore be described in detail hereinafter in connection with such a use although it is to be understood that there are other uses. While the use of plastic milk bottles is a relatively new approach to the merchandising of milk it is believed that the conventional system for getting the milk to the final destination point in plastic bottles involves the following handling steps:

(1) Blow molding the bottles;
(2) Placing the bottles in sanitary containers;
(3) Storing the sanitary containers so as to maintain a backlog;
(4) Removing the bottles from the containers;
(5) Filling the bottles;
(6) Capping the bottles;
(7) Placing the bottles in the usual wood, plastic or metal milk bottle cases, and
(8) Transporting the cases to the final destination point.

It is apparent that all of the above handling steps are not only costly from the standpoint of labor cost but also from the standpoint of the cost of the usual bottle cases. In addition, the condition of the bottles from the standpoint of sanitation can be adversely affected during the handling steps preceding and following filling.

The object of this invention is to provide an improved system providing for low cost sanitary storage and transportation of plastic milk bottles from point of origin to destination point.

Another object of this invention is to provide an improved system of the above described type in which the bottles are initially placed in a sanitary container and thereafter continuously remain in the same container until they reach the final destination point, thereby enabling a fully automated system. Since the container in which the bottles are placed holds the bottles from start to finish in the system, the container is referred to herein as a "single service container."

Another object of this invention is to provide an improved sanitary container which is readily manufactured at an economical cost for use in the above-described system, and which is readily manufactured of cardboard or equivalent material so as to be light in weight and sufficiently strong to fulfill the functional requirements thereof in the system.

Further objects, features and advantages of this invention will become apparent from a consideration of the following description, the appended claims, and the accompanying drawing in which:

FIGURE 1 is a diagrammatic view illustrating the system of this invention;

FIGURE 2 is a vertical sectional view showing two single service containers of this invention arranged in a vertically stacked relation;

FIGURE 3 is a top view of the container stack shown in FIG. 2, with some parts broken away for purposes of clarity; and FIGURE 4 is a fragmentary sectional view of the container stack as seen from substantially the line 4—4 in FIG. 2.

With reference to the drawing, the system of this invention for transporting bottles from a bottle making machine to the point of final destination for filled bottles is shown in FIG. 1 utilizing the single service container of this invention indicated generally at 10. In the system of this invention, plastic bottles formed in a blow molding machine 12 are placed immediately in the single service container 10, which at such time has an open top end 11, so that the bottles are upright. Illustrative bottles are indicated in broken lines at 14 in FIGS. 2 and 3, and as shown therein, the container 10 is of a size to accommodate the bottles 14 so that they are fairly tightly contained and prevented from moving around a substantial amount within the container 10. In a preferred embodiment of the invention shown in the drawing, the container 10 measures about twelve inches by twelve inches in a horizontal plane and is about eleven inches high. Such a container is of a size to support and house four one-gallon bottles 14, as illustrated in FIGS. 2 and 3, or a larger number of bottles of smaller capacity. It is to be understood, however, that the container 10 is adapted to be made in a variety of other sizes. From the blow molding machine 12, the containers 10 are moved to a stack storage area or station 16 at which a plurality of containers 10 are arranged in stacks for storing the empty containers 14 therein for furture use. As will be more fully described hereinafter, during stack storage of the containers 10, the open top ends 11 thereof are closed to keep the containers 10 substantially air tight for sanitation purposes.

From the stack storage station 16, each container 10, which now again has its top end 11 open is moved to a filling station 18 at which a filling machine 20 fills the bottles 14 in each container 10 by depositing milk in the bottles through the open top ends thereof. Each container 10 is then individually moved to a capping station 22 at which a capping machine 24 applies caps to the open top ends of the bottles 14. A conveyor 26 is illustrated for moving the containers 10 from the blow molding machine 12 through the stations 16, 18 and 22. The containers 10 are then restacked at a loading station 16 into a transportation vehicle 28, in this case probably a milk truck, for transport to the final destination station 30.

It can thus be seen that in the system of this invention, the plastic bottles 14 are placed in the container 10 at the blow molding machine 12 and remain in the container 10 until the bottles 14 reach the final destination point 30.

In the case of milk bottles, this final destination point may be either a supermarket, a distribution center, or a home delivery point. In any event the system of this invention enables completely automated handling of the bottles 14 from their point of origin to their destination point by simple handling of the containers 10 in which the bottles are placed.

The single service container 10 enables this completely automated handling of the bottles because it provides for a sanitary enclosure of the bottles at all times which can be produced at a relatively low price, and is sufficiently light in weight to permit easy handling. The system of this invention is particularly adapted to the handling of plastic milk bottles, since half gallon plastic bottles weigh only one-sixteenth as much as glass bottles.

The single service container 10 of this invention, which is preferably formed of common corrugated cardboard, is illustrated in FIGS. 2, 3 and 4 as including an upright body 32 which is of a rectangular shape in cross section. The body 32 consists of a first pair of horizontally aligned laminated side walls 34 (FIG. 2) each of which includes an inner lamination 36 and an outer lamination 38. The body also includes a second pair of horizontally aligned side walls 40 (FIG. 4) each of which includes an inner lamination 42 and an outer lamination 44. A laminated bottom wall 46, which consists of an inner lamination 48 and an outer lamination 50, is also provided on the body 32. As shown in FIG. 2, the inner side wall laminations 36 are integrally formed with the outer bottom wall lamination 50. As a result, the side wall laminations 36 and the bottom wall lamination 50 are readily formed as a panel unit from a single rectangular piece of cardboard folded at the junctures of the side wall laminations 36 with the bottom wall lamination 50. Likewise, the inner side wall laminations 42 are integrally formed with the inner bottom wall lamination 48 (FIG. 4) so that these components of the body 32 can be conveniently formed as a panel unit from a single rectangular piece of cardboard folded at the junctures of the side wall laminations 42 with the bottom wall lamination 48. As illustrated in FIG. 3, the side wall laminations 42 are of a width less than the width of the side wall laminations 36 by an amount equal to twice the thickness of the laminations 36. This enables an assembly of the panel units so that the side wall laminations 42 abut at their edges with the inner sides of the side wall laminations 36 to form substantially air-tight joints at the corners of the container 10.

The outer side wall laminations 38 and 44 are integral and are formed as a panel unit, indicated at 52 in FIG. 3, from a single rectangular piece of cardboard which is folded so that it is wrapped around the inner side wall laminations 36 and 42. The ends 54 of the panel unit 52 are arranged in an abutting relation as shown in FIG. 3 at approximately the center of one of the side wall laminations 42. The outer side wall laminations 38 and 44 are preferably secured by a suitable adhesive to the outer sides of the inner side wall laminations 36 and 42, and the bottom wall laminations 48 and 50 are preferably similarly attached.

As shown in FIGS. 2 and 4, the outer side wall laminations 38 and 44 are positioned so that the upper ends 56 thereof are spaced a predetermined distance, indicated at $a$, above the upper ends 58 of the inner side wall laminations 36 and 42. The lower ends 60 of the outer side wall laminations 38 and 44 are spaced above the bottom side 62 of the bottom wall 46 a distance indicated at $b$. As shown in FIGS. 2 and 4, this arrangement enables stacking of one container 10 on top of another, with the bottom end of the upper container telescoping into the upper end of the lower container. The distance $a$ is preferably maintained slightly greater than the distance $b$ so that when two containers 10 are stacked as shown in FIGS. 2 and 4, the lower ends 60 of the outer side wall laminations in the upper container 10 will abut and be supported on the upper ends 56 of the outer side wall laminations in the lower container 10. This arrangement is advantageous for sanitary purposes because the outer side wall laminations on stacked containers 10 then cooperate to form a continuous barrier to the entry of foreign matter into the containers 10.

By virtue of the fact that the containers 10 are of double wall construction, with the inner side wall laminations being arranged in an abutting relation and provided with the wrap around outer side wall laminations, each container 10 is substantially air tight when the containers 10 are arranged in a stack. Only a two-high stack is illustrated in FIG. 2 for convenience of illustration, but in actual use seven-high stacks are preferred.

A rectangular cover or lid 66 is placed on the uppermost container 10 in each stack so as to close the open upper end 11 of the container. As shown in FIGS. 2 and 4, the cover 66 consists of a rectangular panel dimensioned so that it will telescope into the upper end of the container 10 and rest on the upper ends 58 of the inner side wall laminations 36 and 42, and at its edges abut the inner sides of the outer side wall laminations 38 and 44. When the cover 66 is so positioned the inside of the container 10 is substantially air tight.

From the above description it is seen that this invention provides a single service container 10 which is of a lightweight, rigid, double wall construction such that a plurality of containers 10 are nestable in a vertical stack. When so arranged, the containers are substantially air tight so that the bacterial content of the bottles 14 therein is not substantially increased during storage of the containers 10 at the storage station 16. Because the containers 10 are formed so that they are readily manufactured from lightweight corrugated cardboard, or equivalent material such as plastic sheet, they are readily stacked and unstacked, and when the containers 10 are removed from a stack, each has an open top end 11 so that the upright bottles therein can be readily filled at the station 18 and capped at the station 22. The containers 10 are then readily restacked for storage, if desired, and subsequent transportation in the truck 28 to the final destination point 30. As a result, one embodiment of the system of this invention, the handling of the bottles from the point of origin to the destination point 30 involves handling of only the containers 10, which are light in weight, so that the entire system is readily automated. In another embodiment of the invention, in which filling and capping equipment at stations 18 and 22 does not permit filling and capping of bottles 14 while in the containers 10, the bottles are removed from the containers 10, filled and capped and replaced in the containers 10 for subsequent transportation. In both embodiments, the system utilizes sanitary storage and transportation of the bottles 14 in stacked containers 10 which are substantially air tight when stacked.

It will be understood that the system and the single service container which are herein disclosed and described are presented for purposes of explanation and illustration and are not intended to indicate limits of the invention, the scope of which is defined by the following claim.

What is claimed is:

1. In a system for transporting plastic bottles containing a liquid from a station at which said bottles are formed to a final destination point for said bottled liquid, the steps comprising:
    (a) placing the bottles from said forming station in upright positions in a plurality of stackable open top containers each of which is substantially air tight when the top is closed;
    (b) stacking said containers in superimposed relationship so that each container which has a container superimposed thereon is closed in sealed relationship by the superimposing container and placing a cover in sealed relationship on each uppermost container of the stacked containers so that bottles in each such closed container are stored in a sealed environment;

(c) sequentially unstacking said containers and filling the bottles in each container while the bottles are in each such container;
(d) capping the bottles in each container while the bottles are in each such container; and
(e) re-stacking said containers in superimposed relationship and placing a cover on each uppermost container with the filled and capped bottles therein stored in a sealed environment for transportation to said destination point.

References Cited

UNITED STATES PATENTS

| 598,757 | 2/1898 | Amsinck | 206—56 |
|---|---|---|---|
| 3,015,917 | 1/1962 | Moore | 53—35 X |

TRAVIS S. McGEHEE, *Primary Examiner.*

R. L. FARRIS, *Assistant Examiner.*

U.S. Cl. X.R.

53—26